United States Patent
Li et al.

(10) Patent No.: US 9,391,821 B2
(45) Date of Patent: Jul. 12, 2016

(54) METHOD AND APPARATUS FOR FILTER BANK MULTI-CARRIER SIGNAL TRANSMISSION AND CHANNEL ESTIMATION

(71) Applicant: Alcatel Lucent, Boulogne Billancourt (FR)

(72) Inventors: Dong Li, Shanghai (CN); Jinhui Chen, Shanghai (CN); Keying Wu, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 14/388,715

(22) PCT Filed: Mar. 25, 2013

(86) PCT No.: PCT/IB2013/000700
§ 371 (c)(1),
(2) Date: Sep. 26, 2014

(87) PCT Pub. No.: WO2013/144715
PCT Pub. Date: Oct. 3, 2013

(65) Prior Publication Data
US 2015/0049836 A1 Feb. 19, 2015

(30) Foreign Application Priority Data
Mar. 29, 2012 (CN) .......................... 2012 1 0088232

(51) Int. Cl.
*H04L 27/04* (2006.01)
*H04L 27/26* (2006.01)
(Continued)

(52) U.S. Cl.
CPC .......... *H04L 27/2613* (2013.01); *H04L 5/0048* (2013.01); *H04L 25/0232* (2013.01); *H04L 27/264* (2013.01); *H04L 27/2698* (2013.01); *H04L 25/0228* (2013.01)

(58) Field of Classification Search
CPC . H04L 27/0008; H04L 1/0071; H04L 1/0003; H04L 27/00
USPC .......................................................... 375/295
See application file for complete search history.

(56) References Cited

U.S. PATENT DOCUMENTS 8,194,531 B2    6/2012   Lele et al.
8,358,668 B2 *  1/2013   Zhang .................. H04L 1/0025
                                                        370/203

(Continued)

FOREIGN PATENT DOCUMENTS

CN         1848835      10/2006
CN       101542991       9/2009

(Continued)

OTHER PUBLICATIONS

Javaudin et al., "Pilot-aided channel estimation for OFDM/OQAM," IEEE Semiannual Vehicular Technology Conference, vol. 3, pp. 1581-1585, XP010862427, Apr. 22, 2003.

(Continued)

*Primary Examiner* — Qutbuddin Ghulamali
(74) *Attorney, Agent, or Firm* — Fay Sharpe, LLP (57) ABSTRACT

The present invention provides a method for transmitting signals in a transmitter of a filter band multi-carrier system, comprising steps of: modulating data to obtain modulated data; obtaining a to-be-transmitted signal by framing a pilot preamble symbol with the modulated data; transmitting the to-be-transmitted signal; the pilot preamble symbol consisting of preamble elements, wherein the pilot preamble symbol corresponding to each transmit antenna occupies one filter band multi-carrier modulation symbol. The present invention further provides an apparatus for implementing the method, and a method and apparatus for channel estimation corresponding to the method for transmitting signals.

15 Claims, 5 Drawing Sheets

(51) Int. Cl.
*H04L 5/00* (2006.01)
*H04L 25/02* (2006.01)

(56) References Cited

U.S. PATENT DOCUMENTS

| | | | | |
|---|---|---|---|---|
| 2009/0213949 A1* | 8/2009 | Javaudin | ............. | H04L 27/2613 375/260 |
| 2009/0316569 A1* | 12/2009 | Lele | .................... | H04L 25/0228 370/206 |
| 2010/0220808 A1 | 9/2010 | Kishigami et al. | | |
| 2011/0044394 A1* | 2/2011 | Wu | ...................... | H04B 7/0417 375/267 |
| 2012/0243625 A1* | 9/2012 | Berg | ............................ | 375/260 |

FOREIGN PATENT DOCUMENTS

| | | |
|---|---|---|
| CN | 101945066 | 1/2011 |
| JP | 2003-101503 A | 4/2003 |
| JP | 2006-054706 A | 2/2006 |
| JP | 2007-037151 A | 2/2007 |
| JP | 2008-028515 A | 2/2008 |
| JP | 2008-160822 A | 7/2008 |
| WO | WO 2011/039431 A1 | 4/2011 |

OTHER PUBLICATIONS

Fei Deng et al., "An Effective Preamble-Based Channel Estimation Structure for OFDM/OQAM Systems," Wireless Communications Networking and Mobile Computing (WICOM), IEEE, pp. 1-4, XP031827585, Sep. 23, 2010.

Lele et al., "Channel estimation methods for preamble-based OFDM/OQAM modulations," European Transactions on Telecommunications, vol. 19, No. 7, 7 pages, XP001517656, Nov. 1, 2008.

International Search Report for PCT/IB2013/000700 dated Aug. 21, 2013.

Fei Deng, "Research and Simulation of OFDM/OQAM Systems Wireless Communication Technology," Master Dissertation, University of Electronic Science and Technology of China, Department of Communication and Information Systems, Dec. 15, 2011, 16 pages.

Hu Su, "Study on PAPR Reduction and offset QAM in OFDM System," China, Dec. 15, 2010, 141 pages.

\* cited by examiner

| 0 | 1  | 0 |      |
|---|----|---|------|
| 0 | 1  | 0 |      |
| 0 | -1 | 0 |      |
| 0 | -1 | 0 |      |
| 0 | 1  | 0 |      |
| 0 | 1  | 0 | Data |
| . | .  | . |      |
| . | .  | . |      |
| . | .  | . |      |
| 0 | -1 | 0 |      |
| 0 | -1 | 0 |      |

Fig. 1

| P11 |      |
|-----|------|
| P21 |      |
| P12 |      |
| P22 |      |
| P13 | Data |
| P23 |      |
| P14 |      |
| P24 |      |
| .   |      |
| .   |      |
| .   |      |

Fig. 2

| P11 | P51 |      |
|-----|-----|------|
| P21 | P61 |      |
| P31 | P71 |      |
| P41 | P81 |      |
| P12 | P52 | Data |
| P22 | P62 |      |
| P32 | P72 |      |
| P42 | P82 |      |
| .   | .   |      |
| .   | .   |      |
| .   | .   |      |
| .   | .   |      |

Fig. 3

| 1   |      |
|-----|------|
| 1   |      |
| -1  |      |
| 1   |      |
| -1  | Data |
| -1  |      |
| -1  |      |
| .   |      |
| .   |      |
| 1   |      |
| -1  |      |

METHOD AND APPARATUS FOR FILTER BANK MULTI-CARRIER SIGNAL TRANSMISSION AND CHANNEL ESTIMATION

FIELD OF THE INVENTION

The present invention relates to wireless communication technology field, and more particularly to a method and apparatus for signal transmission and corresponding channel estimation of a Filter Band Multi-Carrier (FBMC for short) system.

BACKGROUND OF THE INVENTION

Filter band multi-carrier modulation is a multi-carrier technology whose primary characteristic is that its subcarrier spectrum in the frequency domain may be designed and controlled flexibly such that it may properly suppress the out-of-band spectrum. The main manner for implementing FBMC is OQAM (offset QAM), that is, the real part and imaginary part of a complex constellation modulation symbol are separated so as to modulate respective pulse signals at a real and imaginary part interval in the time domain and frequency domain. Since the pulse signals have good energy concentration in both the time domain and the frequency domain, compared with the existing OFDM system, it may efficiently reduce the ICI/ISI influence without inserting any cyclic-prefix so that the FBMC system has higher spectral efficiency than the OFDM system. Meanwhile, each subcarrier spectrum decays fast, which facilitates reduction of the out-of-band radiation and improvement of spectrum perception accuracy. Therefore, the FBMC system is especially suitable for future-oriented wireless communication application such as cognitive radio, etc.

In contrast to the existing OFDM system capable of providing complex orthogonality, FBMC may only provide the orthogonality for the real part, which results in intrinsic interface on the imaginary part. The intrinsic interference on the imaginary part in the FBMC system becomes a fundamental issue to be faced and solved in system implementation, especially for the design of the pilot symbols in signal transmission and the corresponding channel estimation methods.

The most popular existing FBMC channel estimation method is the Interference Approximation Method (IAM for short). In the IAM method, the intrinsic interference on the imaginary part is approximated by mainly using a special pilot preamble symbol (as shown in FIG. 1), and then an equivalent virtual complex pilot is constituted by using the real part of the pilot and the approximated intrinsic interference on the imaginary part so as to obtain corresponding channel estimation results.

Figure 1:
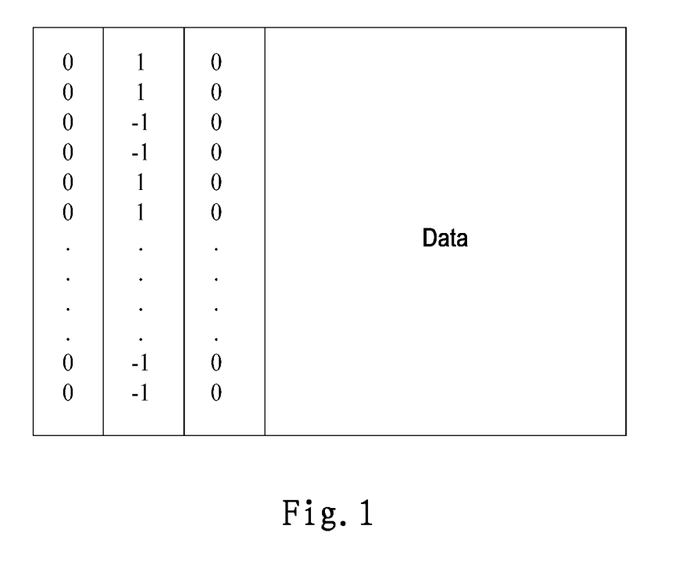
FIG. 1 illustrates a pattern of a pilot preamble symbol in the IAM method.

The main problem of the IAM method is that as shown in FIG. 1, the pilot preamble symbol used by IAM needs to occupy at least 3 FBMC modulation symbols (two FBMC modulation symbols are equivalent to one OFDM modulation symbol), and this pilot overhead greatly reduces the spectral efficiency of the system, and to some extent even partially counteracts the benefit of the FBMC system over the existing OFDM system.

Hence, a new method for designing pilot preamble symbols for signal transmission in the FBMC system and corresponding channel estimation methods is needed.

SUMMARY OF THE INVENTION

In order to solve the above problem in the prior art, the present invention proposes designing a pilot preamble symbol, which only occupies one FBMC modulation symbol for each transmit antenna; and in a case of multiple transmit antennas, a plurality of the pilot preamble symbols are combined and multiplexed into one or more FBMC modulation symbols. At the receiving side, a signal containing the above pilot preamble symbol is received and a channel frequency response set of a plurality of pilot subcarriers corresponding to respective transmit antennas is overall processed by using the correlation of the channel frequency responses between different subcarriers of a multicarrier system, thereby obtaining corresponding channel estimation results.

Specifically, according to a first aspect of the present invention, there is provided a method for transmitting signals in a transmitter of a filter band multi-carrier system, comprising steps of: A. modulating data to obtain modulated data; B. obtaining a to-be-transmitted signal by framing a pilot preamble symbol with the modulated data; and C. transmitting the to-be-transmitted signal; in the step B, the pilot preamble symbol consists of preamble elements, wherein the pilot preamble symbol corresponding to each transmit antenna occupies one filter band multi-carrier modulation symbol.

Preferably, when a number of transmit antennas is greater than one, the step B further comprises combining a plurality of the pilot preamble symbols corresponding to a plurality of transmit antennas into one or more filter band multi-carrier modulation symbols.

Preferably, a sequence formed by the preamble elements is a pseudo-random sequence weighted by a first preset value.

More preferably, the first preset value is greater than or equal to 1.

According to a second aspect of the present invention, there is provided a method for performing channel estimation in a receiver of a filter band multi-carrier system, comprising steps of: I. receiving a signal, wherein the signal contains a pilot preamble symbol; and II. performing channel estimation based on the pilot preamble symbol; characterized in that: the pilot preamble symbol consists of preamble elements, wherein the pilot preamble symbol corresponding to each transmit antenna occupies one filter band multi-carrier modulation symbol.

Preferably, the step I comprises obtaining a channel frequency response set consisting of a plurality of pilot subcarrier channel frequency responses corresponding to respective transmit antennas; and the step II comprises performing channel estimation based on correlation between the plurality of pilot subcarrier channel frequency responses corresponding to respective transmit antennas.

More preferably, when the preamble elements of the pilot preamble symbol are mapped to subcarriers equally spaced or consecutively, the step II comprises: performing a Fourier transform based channel estimation on the channel frequency response set to obtain an estimated channel frequency response set.

More preferably, when the preamble elements of the pilot preamble symbol are mapped to subcarriers equally spaced or consecutively, the step II comprises: performing an inverse fast Fourier transform on the channel frequency response set to obtain a channel impulse response set corresponding to the channel frequency response set; performing, on the channel impulse response set, a filtering processing with respect to intrinsic interference on imaginary part and noise in filter band multi-carrier modulation to obtain a filtered channel impulse response set; determining whether the preamble elements of the pilot preamble symbol are mapped to subcarriers at an equal interval greater than 1; if the preamble elements of the pilot preamble symbol are mapped to subcarriers at an equal interval greater than 1, performing a zero interpolation processing corresponding to the interval on the filtered channel impulse response set to obtain an estimated channel impulse response set, and performing a fast Fourier transform on the estimated channel impulse response set to obtain the estimated channel frequency response set; if the preamble elements of the pilot preamble symbol are consecutively mapped to subcarriers, taking the filtered channel impulse response set as an estimated channel impulse response set; and performing a fast Fourier transform on the estimated channel impulse response set to obtain the estimated channel frequency response set.

Preferably, the step II comprises: performing a linear minimum mean square error based channel estimation on the channel frequency response set to obtain an estimated channel frequency response set using a filtering matrix below:

$$W = R_{cc}\left(R_{ac} + \frac{1}{\gamma_p}I_{|S_{idx}|}\right)^{-1}$$

where $R_{ac}$ denotes an auto-correlation matrix of a pilot subcarrier channel frequency response; $R_{cc}$ denotes a cross-correlation matrix of a subcarrier channel frequency response to be estimated and a pilot subcarrier channel frequency response; $\gamma_p$ represents coefficients related to enhancement of pilot power; $I_{|S_{idx}|}$ denotes an identity matrix with size of $|S_{idx}|$; and $|S_{idx}|$ denotes a number of pilot subcarriers.

According to a third aspect of the present invention, there is provided an apparatus for transmitting signals in a transmitter of a filter band multi-carrier system, comprising: a modulation unit, configured to modulate data to obtain modulated data; a preamble insertion unit, configured to obtain a to-be-transmitted signal by framing a pilot preamble symbol with the modulated data; a transmit unit, configured to transmit the to-be-transmitted signal; characterized in that the pilot preamble symbol consists of preamble elements, wherein the pilot preamble symbol corresponding to each transmit antenna occupies one filter band multi-carrier modulation symbol.

Preferably, when a number of transmit antennas is greater than one, the preamble insertion unit is further configured to combine a plurality of the pilot preamble symbols corresponding to a plurality of the transmit antennas into one or more filter band multi-carrier modulation symbols.

Preferably, the preamble insertion unit further comprises a sequence generation unit configured to generate a pseudo-random binary sequence weighted by a first preset value.

According to a fourth aspect of the present invention, there is provided an apparatus for performing channel estimation in a receiver of a filter band multi-carrier system, comprising: a receiving unit, configured to receive a signal, wherein the signal contains a pilot preamble symbol; a channel estimation unit, configured to perform channel estimation based on the pilot preamble symbol; characterized in that: the pilot preamble symbol consists of preamble elements, wherein the pilot preamble symbol corresponding to each transmit antenna occupies one filter band multi-carrier modulation symbol.

Preferably, the receiving unit is configured to obtain a channel frequency response set consisting of a plurality of pilot subcarrier channel frequency responses corresponding to respective transmit antennas; and the channel estimation unit is configured to perform channel estimation based on correlation between the plurality of pilot subcarrier channel frequency responses corresponding to respective transmit antennas.

Preferably, the channel estimation unit is configured to, when the preamble elements of the pilot preamble symbol are mapped to a subcarrier equally spaced or consecutively, perform a Fourier transform based channel estimation on the channel frequency response set to obtain an estimated channel frequency response set.

Preferably, the channel estimation unit is configured to perform a linear minimum mean square error based channel estimation on the channel frequency response set to obtain an estimated channel frequency response set.

In the present invention, by using the pilot preamble symbol that only occupies one FBMC modulation symbol for each transmit antenna, and using a corresponding channel estimation method at the receiving side, the pilot overhead is reduced efficiently and the spectral efficiency of the system is improved; meanwhile, it is indicated via the computer simulation that the present invention can achieve a better channel estimation performance than the existing IAM method. In other words, the present invention achieves both the beneficial effects of reducing overhead and improving performance simultaneously.

BRIEF DESCRIPTION OF THE DRAWINGS

Other features, objects and advantages of the present invention will become more apparent with reference to the following detailed description of nonrestrictive embodiments in conjunction with the accompanying drawings.

Wherein, the same or similar reference signs represent the same or similar step features or units/modules.

DETAILED DESCRIPTION OF EMBODIMENTS

Figure 2:
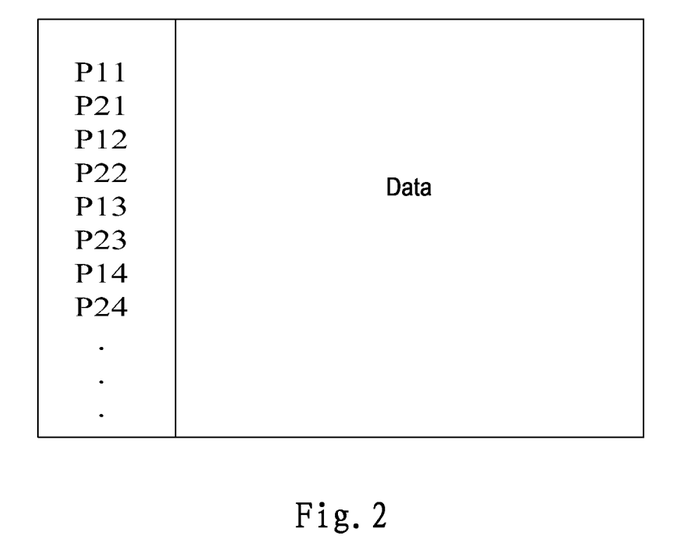
FIG. 2 illustrates a pattern in which pilot preamble symbols of a plurality of transmit antennas are multiplexed to one FBMC modulation symbol according to the present invention.

As shown in FIG. 2, the pilot preamble symbols for a plurality of transmit antennas may be multiplexed to one FBMC modulation symbol. For example, for antenna 1, preamble elements (P11, P12, P13, P14 . . . ) are mapped to odd subcarriers, and then are transmitted from antenna 1. For antenna 2, preamble elements (P21, P22, P23, P24 . . . ) are mapped to even subcarriers, and then are transmitted from antenna 2. Although the pilot preamble symbols of the two antennas are transmitted simultaneously, due to the orithogonality in the frequency domain, there is no crosstalk between them. The receiving side may respectively estimate the channels of the two transmit antennas just as the case of a single antenna.

Figure 3:
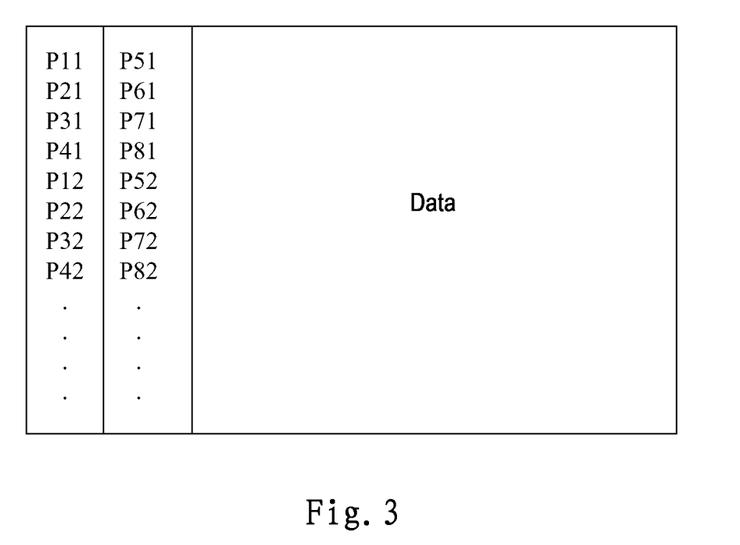
FIG. 3 illustrates a pattern in which pilot preamble symbols of a plurality of transmit antennas are multiplexed to a plurality of FBMC modulation symbols according to the present invention.

As shown in FIG. 3, the pilot preamble symbols for a plurality of transmit antennas may be multiplexed to a plurality of FBMC modulation symbols. For example, for 8 transmit antennas, the first 4 preamble elements (P1, P2, P3, P4) are multiplexed to the first FBMC modulation symbol (with pilot interval of 4) while the other 4 preamble elements (P5, P6, P7, P8) are multiplexed to the second FBMC modulation symbol. In this manner, the preamble elements of the two groups of antennas are orthogonal in time domain, thereby the receiving side may respectively perform respective channel estimations for all antennas just as the case of a single antenna.

Specific embodiments are provided below respectively for two situations where the preamble elements of the pilot preamble symbols are mapped to the subcarriers equally spaced and unequally spaced.

Without loss of generality, a discussion will be made according to the case of a single transmit antenna in the following embodiments, and for a plurality of transmit antennas, it may easily come down to the single antenna case as described above.

First Embodiment

In the following embodiment, it is discussed that the preamble elements are mapped to the subcarriers equally spaced.

Figure 4:
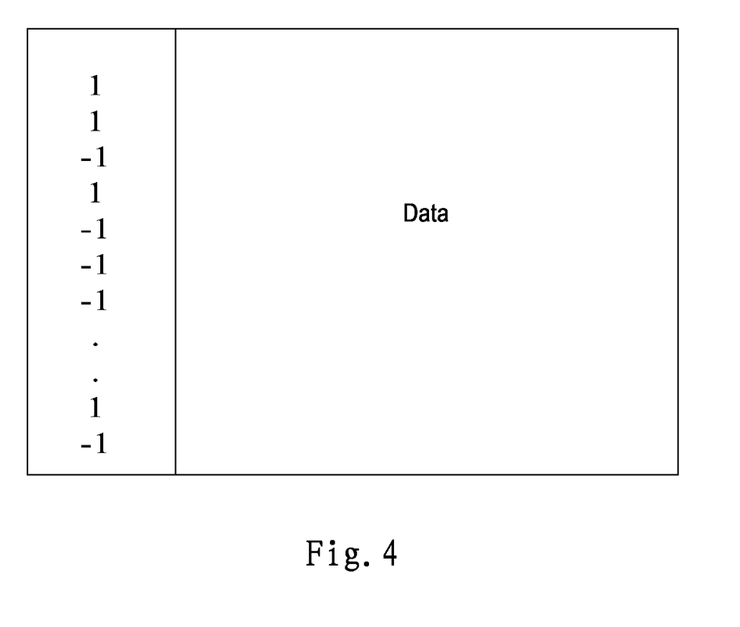
FIG. 4 illustrates a pattern of a pilot preamble symbol of which preamble elements are mapped to subcarriers consecutively according to one embodiment of the present invention.

Design of Pilot Preamble Symbols:

Referring to FIG. 4, without loss of generality, the situation is selected where the interval is 1, i.e. the preamble elements are mapped to the subcarrier consecutively; where the sequence of the preamble elements takes a pseudo-random sequence weighted by a weighting factor of 1.

The advantage for using a pseudo-random sequence is that it will be convenient to de-correlate intrinsic interferences on different subcarriers at the receiving side, which is beneficial for the subsequent processing of filtering the intrinsic interferences.

The weighting factor may also be selected to be a relatively large coefficient related to pilot power enhancement, which helps to improve the signal-to-interference-plus-noise ratio on the pilot to thereby improve the channel estimation accuracy, e.g. using a value greater than 1.

Figure 5:
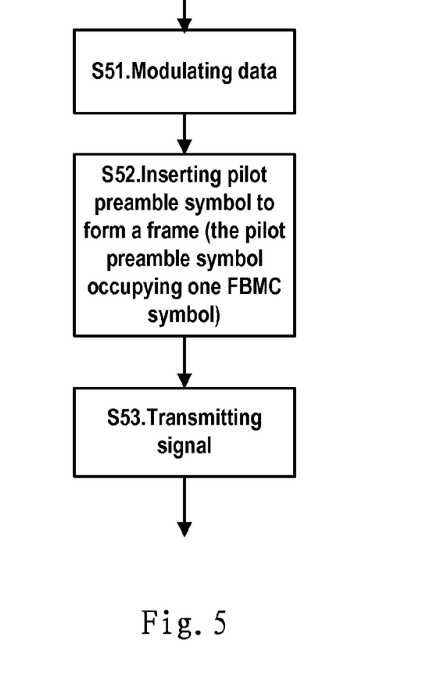
FIG. 5 illustrates a flowchart for signal transmission according to the present invention.

According to the above pilot preamble symbol design, the following method for transmitting signals is implemented in the transmitter of the FBMC system, as shown in FIG. 5:

S51. modulating data to obtain modulated data;

S52. obtaining a to-be-transmitted signal by framing the pilot preamble symbol as designed above with the modulated data; and S53. transmitting the to-be-transmitted signal.

Channel Estimation Method:

Firstly, a signal model of the FBMC system is established as follows:

$$y_i = h_i(p_i + jw_i) + n_i, i \in S_{idx},$$

where the subscript i indicates index of a subcarrier, $y_i$ indicates the received pilot signal, $h_i$ indicates the ideal channel response, $p_i$ indicates the transmitted pilot signal, $w_i$ indicates the intrinsic interference on the imaginary part, j indicates the imaginary unit, and $n_i$ indicates the additive white Gaussian noise. $S_{idx}$ is the set of all the pilot subcarrier indexes which consists of two parts, i.e. $S_{idx} = S_{idx}^+ \cup S_{idx}^-$, where the subsets $S_{idx}^+$ and $S_{idx}^-$ respectively indicate positively indexed subcarriers and negatively indexed subcarriers. For simple expression purpose, it is assumed that the direct current subcarriers belong to $S_{idx}^+$ and the indexes are ranked in an ascending order in the sets of $S_{idx}$, $S_{idx}^+$ and $S_{idx}^-$. Generally speaking, $|S_{idx}^+| = |S_{idx}^-| = |S_{idx}|/2$, where 1.1 denotes the size of the set.

The following frequency response expression is derived from the signal mode:

$$\hat{h}_i = \frac{y_i}{p_i} = h_i + j\underbrace{\frac{h_i w_i}{p_i} + \frac{n_i}{p_i}}_{h_i^{wn}}, \qquad (1)$$

$$i \in S_{idx},$$

where in the right side of equation (1), the first term $h_i$ denotes the ideal channel response, the second term comes from the so-called intrinsic interference on the imaginary part, and the third term comes from the additive white Gaussian noise. The combination of the second and third terms is denoted as $h_i^{wn}$, that is, $h_i^{wn}$ denotes the factor that will degrade the channel estimation performance.

A vector with the size of the smallest value, denoted as $N_{FFT}$, among all the integer powers of 2 and greater than $|S_{idx}|$ is constructed as follows:

$$\underline{\hat{h}} = \underline{h} + \underline{h}^{wn} =$$

$$\left[ \underbrace{\hat{h}_{S_{idx}^+(1)} \hat{h}_{S_{idx}^+(2)} \cdots \hat{h}_{S_{idx}^+(|S_{idx}^+|)}}_{|S_{idx}^+| \text{ elements}} \underbrace{0 \cdots 0}_{N_{FFT} - |S_{idx}|} \underbrace{\hat{h}_{S_{idx}^-(1)} \hat{h}_{S_{idx}^-(2)} \cdots \hat{h}_{S_{idx}^-(|S_{idx}^-|)}}_{|S_{idx}^-| \text{ elements}} \right]^T$$

The superscript T denotes the transposition operation. An inverse fast Fourier transform is performed on this vector to obtain a channel impulse response set in the delay domain, denoted as $\underline{\hat{h}}_{cir}$:

$$\begin{aligned} \underline{\hat{h}}_{cir} &= IFFT(\underline{\hat{h}}) \\ &= IFFT(\underline{h} + \underline{h}^{wn}) \\ &= IFFT(\underline{h}) + IFFT(\underline{h}^{wn}) \\ &= \underline{\hat{h}}_{cir}^{useful} + \underline{\hat{h}}_{cir}^{useless} \end{aligned} \qquad (2)$$

From equation (2), it can be seen that the channel impulse response contains two parts, i.e. the useful signal $\underline{\hat{h}}_{cir}^{useful}$ and the useless signal $\underline{\hat{h}}_{cir}^{useless}$, where the latter further contains contributions of the intrinsic interference on the imaginary part and the additive white Gaussian noise.

Considering the correlation between a plurality of pilot subcarrier channel frequency responses, after the inverse fast Fourier transform operation, the above useful signal will concentrate to the delay domain with its beginning part not beyond the maximum delay spread of the channel, while the useless signal will be evenly spread over the delay domain. Thus, most of the intrinsic interference on the imaginary part and the noise can be easily filtered and the useful signal may be remained by using a window function to filter the signals in the delay domain.

To implement the filtering, the maximum channel delay, denoted as $N_{MaxDelay}$, needs to be estimated in advance. However, the maximum channel delay is largely dependent on the environment factors, and thus can be obtained easily through channel statistical measurement or experiences. The filtering operation can be expressed as follows:

$$\hat{h}_{cir}^{filtered} = \begin{cases} \hat{h}_{cir,m}, & 1 \leq m \leq N_{MaxDelay} \\ \hat{h}_{cir,m} \cdot (1 - G(m - N_{MaxDelay})), & N_{MaxDelay} < m \leq N_{FFT} - N_{backoff} \\ \hat{h}_{cir,m}, & N_{FFT} - N_{backoff} < m \leq N_{FFT} \end{cases}$$

where $G(n)$, $n=1, 2, \ldots, N_{FFT}-N_{backoff}-N_{MaxDelay}$ represents a window function, such as a rectangular window, that is, $G(n)=1$, which means the signal within that duration is totally filtered out. Considering that the useful signal $\hat{h}_{cir}^{useful}$ in the channel impulse response is actually the true channel impulse response convolved with a sine function, which results in some form of energy diffusion, that is, there is also part of the useful signal at the end of the delay domain, and thus a parameter $N_{backoff}$ is introduced to the filtering operation. Generally, this parameter can be set to a relatively small value, e.g., 10.

With the above filtering operation, a filtered channel impulse response set is obtained. When the preamble elements are consecutively mapped to subcarriers, the filtered channel impulse response set acts as an estimated channel impulse response set, and a fast Fourier transform may be performed on it to obtain an estimated channel frequency response set for use in the subsequent channel equalization processing.

When the preamble elements are mapped to subcarriers at an equal interval greater than 1, an interpolation processing is required for the filtered channel impulse response set, i.e., zeros corresponding to the pilot interval are inserted into the set so that the ratio of the sequence lengths after and before zero interpolation equals to the pilot interval value. The set after the interpolation acts as an estimated channel impulse response set, and a fast Fourier transform may be performed on it to obtain an estimated channel frequency response set.

Figure 6:
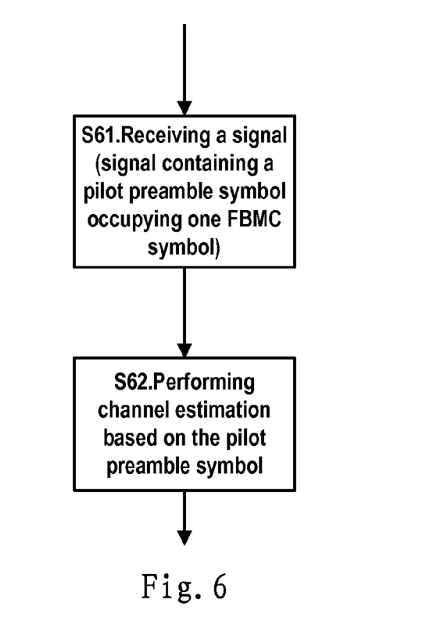
FIG. 6 illustrates a flowchart for channel estimation according to the present invention.

Based on the above channel estimation method, the following method for channel estimation is implemented in the receiver of the FBMC system, as shown in FIG. 6.

S61. receiving a signal containing the above pilot preamble symbol; and

S62. performing channel estimation using the above channel estimation method.

Second Embodiment

In the following embodiment, it is discussed that the preamble elements are mapped to the subcarriers unequally spaced.

Figure 7:
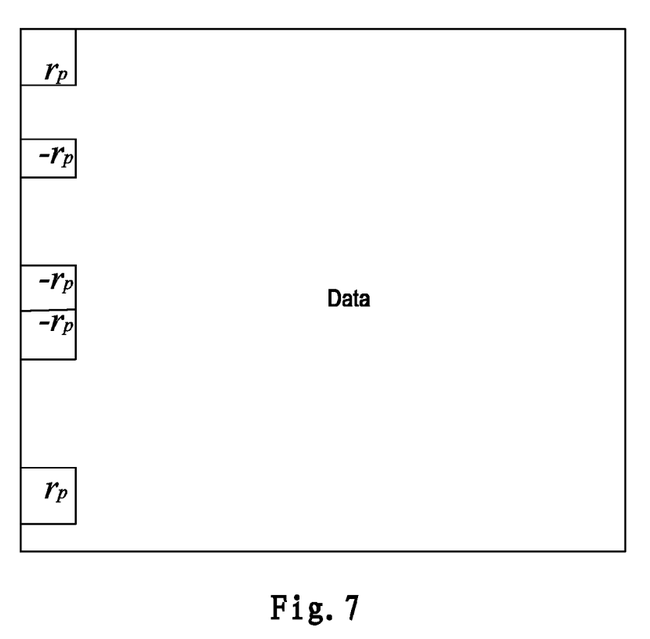
FIG. 7 illustrates a pattern of a pilot preamble symbol of which preamble elements are mapped to subcarriers unequally spaced according to another embodiment of the present invention.

Design of Pilot Preamble Symbols:

Referring to FIG. 7, the preamble elements are mapped to the subcarriers unequally spaced, wherein the sequence of the preamble elements takes a pseudo-random sequence weighted by a weighting factor of $\gamma_p$ that represents a coefficient related to enhancement of the pilot power.

According to the above pilot preamble symbol design, the following method for transmitting signals is implemented in the transmitter of the FBMC system, as shown in FIG. 5.

S51. modulating data to obtain modulated data;

S52. obtaining a to-be-transmitted signal by framing the pilot preamble symbol as designed above with the modulated data; and S53. transmitting the to-be-transmitted signal.

Channel Estimation Method:

Firstly, a signal model of the FBMC system is established as follows:

$$y_i = h_i(p_i + jw_i) + n_i, i \in S_{idx},$$

where the subscript i indicates index of a subcarrier, $y_i$ indicates the received pilot signal, $h_i$ indicates the ideal channel response, $p_i$ indicates the transmitted pilot signal, $w_i$ indicates the intrinsic interference on the imaginary part, and $n_i$ indicates the additive white Gaussian noise. $S_{idx}$ the set of all the pilot subcarriers which consists of two parts, i.e. $S_{idx} = S_{idx}^+ \cup S_{idx}^-$, where the subsets $S_{idx}^+$ and $S_{idx}^-$ respectively indicate positively indexed subcarriers and negatively indexed subcarriers. For simple expression purpose, it is assumed that the direct current subcarriers belong to $S_{idx}^+$ and the indexes are ranked in an ascending order in the sets of $S_{idx}$, $S_{idx}^+$ and $S_{idx}^-$. Generally speaking, $|S_{idx}^+| = |S_{idx}^-| = S_{idx}/2$, where $|.|$ denotes the size of the set.

The following frequency response expression is derived from the signal mode:

$$\hat{h}_i = \frac{y_i}{p_i} = h_i + j\underbrace{\frac{h_i w_i}{p_i} + \frac{n_i}{p_i}}_{h_i^{wn}}, \quad (3)$$

$$i \in S_{idx},$$

where in the right side of equation (3), the first term $h_i$ denotes the ideal channel response, the second term comes from the so-called intrinsic interference on the imaginary part, and the third term comes from the additive white Gaussian noise. The combination of the second and third terms is denoted as $h_i^{wn}$, that is, $h_i^{wn}$ denotes the factor that will degrade the channel estimation performance.

A vector with the size of $|S_{idx}|$ is constructed as follows:

$$\underline{\hat{h}} = \underline{h} + \underline{h}^{wn} = \left[ \underbrace{\hat{h}_{S_{idx}^-(1)} \; \hat{h}_{S_{idx}^-(2)} \; \cdots \; \hat{h}_{S_{idx}^-(|S_{idx}^-|)}}_{|S_{idx}^-| \text{ elements}} \; \underbrace{\hat{h}_{S_{idx}^+(1)} \; \hat{h}_{S_{idx}^+(2)} \; \cdots \; \hat{h}_{S_{idx}^+(|S_{idx}^+|)}}_{|S_{idx}^+| \text{ elements}} \right]^T$$

The superscript T denotes the transposition operation. Considering the correlation of channel frequency responses between different subcarriers, a linear minimum mean square error filtering operation may be introduced as follows:

$$\underline{\tilde{h}} = W\underline{\hat{h}},$$

where the filtering matrix W can be expressed as:

$$W = R_{cc}\left(R_{ac} + \frac{1}{\gamma_p}(1 + \sigma_n^2)I_{|S_{idx}|}\right)^{-1}, \quad (4)$$

where $R_{ac}$ denotes the auto-correlation matrix of the pilot subcarrier channel frequency response; $R_{cc}$ denotes the cross-correlation matrix of a subcarrier channel frequency response to be estimated and a pilot subcarrier channel frequency response; $\gamma_p$ indicates coefficients related to enhancement of the pilot power, i.e. the aforesaid weighting factor; $I_{|S_{idx}|}$ denotes the identity matrix with size of $|S_{idx}|$; $\sigma_n^2$ represents the noise power, i.e. the term of $$\frac{n_i}{p_i}$$

in equation (3); the unit power that is added to $\sigma_n^2$ represents the intrinsic interference power on the imaginary part, i.e. the term of $$j\frac{h_i w_i}{p_i}$$

in equation (3). Here, without loss of generality, it is assumed that $E\{|h_l|^2\}=1$, i.e. the channel frequency response has a normalized average unit power.

Given the maximum delay spread $N_{MaxDelay}$ of the channel, the channel correlation matrix of all subcarriers can be generated by the following method:

$$R = F^H D F,$$

where the superscript H represents the conjugate transposition and F represents a normalized IFFT transform matrix:

$$\{F\}_{n,k} = \frac{1}{\sqrt{N_{FFT}}} e^{j2\pi nk/N_{FFT}},$$

$$n, k = 0, 1, \ldots, N_{FFT} - 1.$$

The matrix D represents a diagonal matrix of $N_{FFT} \times N_{FFT}$ as below:

$$D = \mathrm{diag}\left\{\left[\underbrace{\frac{N_{FFT}}{N_{MaxDelay}} \cdots \frac{N_{FFT}}{N_{MaxDelay}}}_{N_{MaxDelay}} 0 \cdots 0\right]\right\}$$

After obtaining R, the auto-correlation matrix $R_{ac}$ and the cross-correlation matrix $R_{cc}$ in equation (4) may be obtained by taking a submatrix constituted by corresponding rows and columns in R based on the subcarrier indexes of the pilot subcarriers and the subcarriers to be estimated (for the negative subcarrier indexes, $N_{FFT}$ is added). Specifically, $R_{ac}$ is obtained by taking the submatrix constituted by rows corresponding to the pilot subcarrier indexes and columns corresponding to the pilot subcarrier indexes; and $R_{cc}$ is obtained by taking the submatrix constituted by rows corresponding to the to-be-estimated subcarrier indexes and columns corresponding to the pilot subcarrier indexes.

In addition, considering the noise power part in equation (4), it is usually difficult to estimate the noise power in real time. However, generally, the power of an intrinsic interference on the imaginary part is much greater than the noise power, and it is also shown via simulation that the noise power does not have significant effect on the performance of channel estimation. Therefore, the filtering matrix as shown in equation (4) may be approximated as:

$$W = R_{cc}\left(R_{ac} + \frac{1}{\gamma_p} I_{|S_{idx}|}\right)^{-1}.$$

By the above filtering operation, an estimated channel frequency response set is obtained for use in the subsequent channel equalization processing.

Considering the large computational overhead for computing the inverse matrix, a non real-time manner may also be used, i.e. the filtering matrix can be computed and saved in the memory in advance for immediate use in channel estimation.

Based on the above channel estimation method, the following method for channel estimation is implemented in the receiver of the FBMC system, as shown in FIG. 6:

S61. receiving a signal containing the above pilot preamble symbol;

S62. performing a channel estimation using the above channel estimation method.

In the following, an apparatus corresponding to the above method as provided by the present invention will be described by making references to the block diagrams. It will be simplified since the unit/device features in the apparatus have corresponding relationships with the step features in the above method.

Figure 8:
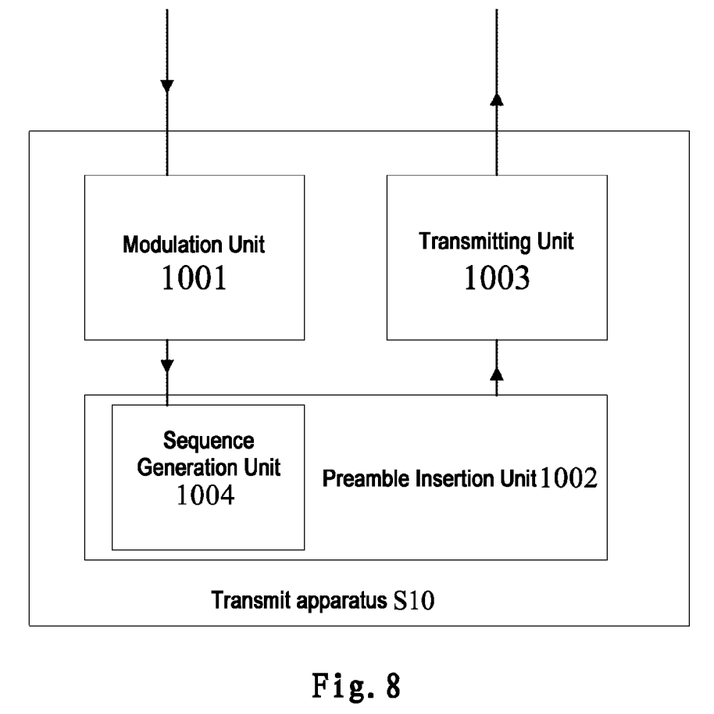
FIG. 8 illustrates a block diagram for a signal transmitting apparatus according to the present invention.

FIG. 8 illustrates a block diagram for a transmitting apparatus S10 for transmitting signals in the transmitter of the filter band multi-carrier system, wherein the transmitting apparatus S10 comprises:

a modulation unit 1001, configured to modulate data to obtain modulated data;

a preamble insertion unit 1002, configured to obtain a to-be-transmitted signal by framing a pilot preamble symbol with the modulated data; and a transmitting unit 1003, configured to transmit the to-be-transmitted signal.

The apparatus S10 is characterized in that the pilot preamble symbol consists of preamble elements, wherein the pilot preamble symbol corresponding to each transmit antenna occupies one filter band multi-carrier modulation symbol.

Preferably, when the number of the transmit antennas is greater than one, the preamble insertion unit 1002 is further configured to combine a plurality of the pilot preamble symbols corresponding to a plurality of the transmit antennas into one or more filter band multi-carrier modulation symbols.

Preferably, the preamble insertion unit 1002 further comprises a sequence generation unit 1004 for generating a pseudo-random sequence weighted by a first preset value.

Figure 9:
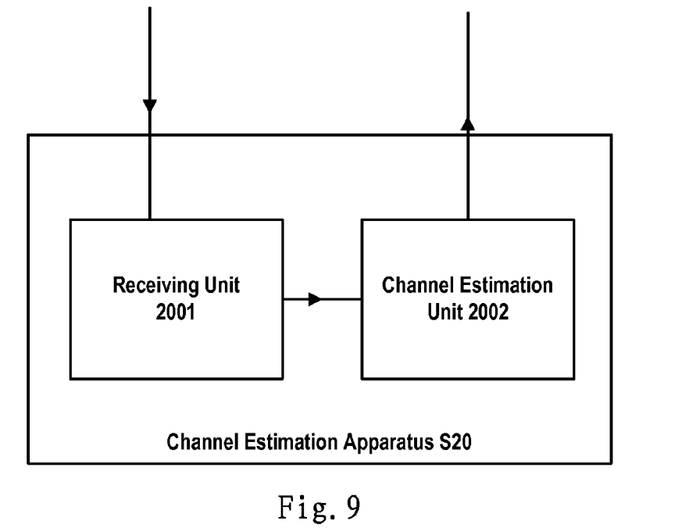
FIG. 9 illustrates a block diagram for a channel estimation apparatus according to the present invention.

FIG. 9 illustrates a block diagram for a channel estimation apparatus S20 for performing channel estimation in the receiver of the filter band multi-carrier system, wherein the channel estimation apparatus S20 comprises:

a receiving unit 2001, configured to receive a signal, wherein the signal contains a pilot preamble symbol;

a channel estimation unit 2002, configured to perform channel estimation based on the pilot preamble symbol.

The apparatus S20 is characterized in that: the pilot preamble symbol consists of preamble elements, wherein the pilot preamble symbol corresponding to each transmit antenna occupies one filter band multi-carrier modulation symbol.

Preferably, the receiving unit 2001 is further configured to obtain a channel frequency response set consisting of a plurality of pilot subcarrier channel frequency responses corresponding to respective transmit antennas, and the channel estimation unit 2002 is further configured to perform channel estimation based on correlation between the plurality of pilot subcarrier channel frequency responses corresponding to respective transmit antennas.

More preferably, the channel estimation unit 2002 is configured to, when the preamble elements of the pilot preamble symbol are mapped to subcarriers equally spaced or consecutively, perform a Fourier transform based channel estimation on the channel frequency response set to obtain an estimated channel frequency response set.

More preferably, the channel estimation unit 2002 is configured to perform a linear minimum mean square error based channel estimation on the channel frequency response set to obtain an estimated channel frequency response set.

To prove the effectiveness of the present invention, simulation experiments are made to compare the present invention with the existing IAM method. In the simulation, QPSK modulation and 1/2 turbo coding are used. Each frame consists of a data portion containing 40 FMBC modulation symbols and respective pilot preamble symbols of the present invention and the IAM method. The channel model uses urban micro scenario of a spatial channel model defined in 3GPP. The sampling rate is 15.36 MHz. The number of useful subcarriers is 600. The simulation parameters are summarized in table 1 as follows:

TABLE 1

Simulation Parameters

| Parameter Name | Parameter Value |
|---|---|
| Modulation Manner | Offset-QPSK |
| Channel Coding | Turbo coding with rate ½ |
| Pilot Preamble Symbol | The proposed scheme in the presnet invention (termed as Intrinsic Interference Filtering, IIF method for short), the scheme in IAM method |
| Frame Structure | Pilot preamble symbol occupying 1 (the IIF method in the present invention) or 3 (IAM method) FBMC modulation symbols and data of 40 FBMC modulation symbols |
| Channel Model | Urban micro scenario of a 3GPP spatial channel model |
| Sampling Frequency | 15.36 MHz |
| Number of Subcarriers | 600 |
| Channel Estimation Parameters | Weighting factor = $\sqrt{2}$, $N_{MaxDelay}$ = 20, $N_{backoff}$ = 10, rectangular window (the latter two parameters only applicable to embodiment 1) |

Figure 10:
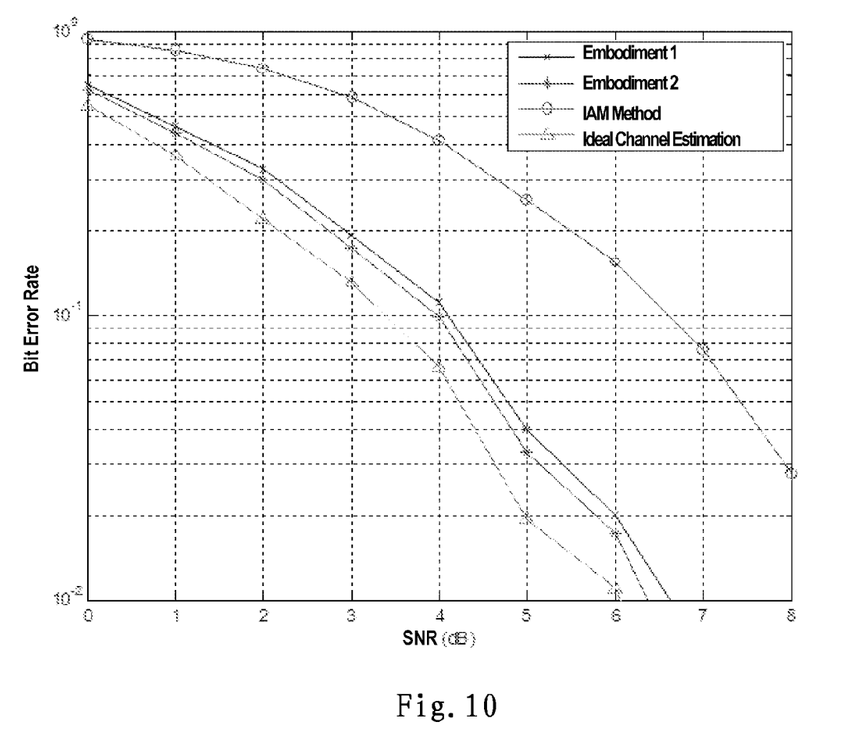
FIG. 10 illustrates the simulation results of performance comparison between the present invention and the IAM method.

The simulation results are shown in FIG. 10. It can be seen that the performance of the present invention outperforms the existing IAM method obviously and only has a loss of about 0.5 dB in comparison with the ideal situation. The simulation results can prove that compared with the existing method, the pilot preamble symbol design and corresponding channel estimation algorithm in the present invention achieve the object of reducing the pilot overhead, and meanwhile keep or even improve the channel estimation performance, which indeed solves the problems existing in the prior art.

Embodiments of the present invention have been describe above, however, the present invention is not limited to specific systems, devices and specific protocols, and those skilled in the art may make various modifications or variations within the scope of the appended claims.

Those of ordinary skill in the art may understand and implement other changes to the disclosed embodiments by studying the disclosure of the description together with the drawings and the appended claims. In the claims, the term "comprise" or "contain" does not exclude other elements and steps, and the term "one" or "a" does not exclude the plural form. In the present invention, "first" or "second" only represents the name and does not represent the order relationship. In the practical application of the present invention, one component may perform the functions of multiple technical features cited in the claims. Any reference sign in the claims shall not be construed as limitation on the scope.

What is claimed is:

1. A method for transmitting signals in a transmitter of a filter bank multi-carrier system, comprising:
   modulating data to obtain modulated data;
   framing a pilot preamble symbol with the modulated data, thereby obtaining a signal for transmission; and
   transmitting the signal for transmission,
   wherein: in the framing, the pilot preamble symbol consists of preamble elements, wherein the pilot preamble symbol corresponding to each transmit antenna occupies one filter bank multi-carrier modulation symbol.

2. The method according to claim 1, wherein: when a number of transmit antennas is greater than one, the obtaining further comprises combining a plurality of the pilot preamble symbols corresponding to a plurality of the transmit antennas into one or more filter bank multi-carrier modulation symbols.

3. The method according to claim 1, wherein: a sequence formed by the preamble elements is a pseudo-random sequence weighted by a first preset value.

4. The method according to claim 3, wherein: the first preset value is greater than or equal to 1.

5. A method for performing channel estimation in a receiver of a filter bank multi-carrier system, comprising:
   receiving a signal, wherein the signal contains a pilot preamble symbol; and
   performing channel estimation based on the pilot preamble symbol,
   wherein: the pilot preamble symbol consists of preamble elements, wherein a respective pilot preamble symbol corresponding to a respective transmit antenna occupies one filter bank multi-carrier modulation symbol.

6. The method according to claim 5, wherein
   the receiving comprises obtaining a channel frequency response set consisting of a plurality of pilot subcarrier channel frequency responses corresponding to respective transmit antennas; and
   the performing comprises performing channel estimation based on correlation between the plurality of pilot subcarrier channel frequency responses corresponding to respective transmit antennas.

7. The method according to claim 6, wherein when the preamble elements of the pilot preamble symbol are mapped to subcarriers equally spaced or consecutively, the performing comprises: performing a Fourier transform based channel estimation on the channel frequency response set to obtain an estimated channel frequency response set.

8. The method according to claim 7, wherein the performing comprises:
   performing an inverse fast Fourier transform on the channel frequency response set to obtain a channel impulse response set corresponding to the channel frequency response set;
   performing, on the channel impulse response set, a filtering processing with respect to intrinsic interference on imaginary part and noise in filter bank multi-carrier modulation to obtain a filtered channel impulse response set;

determining whether the preamble elements of the pilot preamble symbol are mapped to subcarriers at an equal interval greater than 1;
  if the preamble elements of the pilot preamble symbol are mapped to subcarriers at an equal interval greater than 1, performing a zero interpolation processing corresponding to the interval on the filtered channel impulse response set to obtain an estimated channel impulse response set; and
  performing a fast Fourier transform on the estimated channel impulse response set to obtain the estimated channel frequency response set; or
  if the preamble elements of the pilot preamble symbol are consecutively mapped to subcarriers, taking the filtered channel impulse response set as an estimated channel impulse response set; and
  performing a fast Fourier transform on the estimated channel impulse response set to obtain the estimated channel frequency response set.

9. The method according to claim 6, wherein the performing comprises: performing a linear minimum mean square error based channel estimation on the channel frequency response set to obtain an estimated channel frequency response set.

10. The method according to claim 9, wherein: the channel estimation is performed by using a filtering matrix W:

$$W = R_{cc}\left(R_{ac} + \frac{1}{\gamma_p} I_{|S_{idx}|}\right)^{-1}$$

where $R_{ac}$ denotes an auto-correlation matrix of a pilot subcarrier channel frequency response; $R_{cc}$ denotes a cross-correlation matrix of a subcarrier channel frequency response to be estimated and a pilot subcarrier channel frequency response; $\gamma_p$ represents coefficients related to enhancement of pilot power; $I_{|S_{idx}|}$ denotes an identity matrix with size of $|S_{idx}|$, and $|S_{idx}|$ denotes a number of pilot subcarriers.

11. An apparatus for transmitting signals in a transmitter of a filter bank multi-carrier system, comprising:

a modulation unit, configured to modulate data to obtain modulated data;
  a preamble insertion unit, configured to frame a pilot preamble symbol with the modulated data to obtain a signal for transmission; and
  a transmitting unit, configured to transmit the signal for transmission,
  wherein the pilot preamble symbol consists of preamble elements, wherein the pilot preamble symbol corresponding to each transmit antenna occupies one filter bank multi-carrier modulation symbol.

12. The apparatus according to claim 11, wherein when a number of transmit antennas is greater than one, the preamble insertion unit is further configured to combine a plurality of the pilot preamble symbols corresponding to a plurality of the transmit antennas into one or more filter bank multi-carrier modulation symbols.

13. An apparatus for performing channel estimation in a receiver of a filter bank multi-carrier system, comprising:
  a receiving unit, configured to receive a signal, wherein the signal contains a pilot preamble symbol;
  a channel estimation unit, configured to perform channel estimation based on the pilot preamble symbol,
  wherein: the pilot preamble symbol consists of preamble elements, wherein a respective pilot preamble symbol corresponding to a respective transmit antenna occupies one filter bank multi-carrier modulation symbol.

14. The apparatus according to claim 13, wherein
  the receiving unit is configured to obtain a channel frequency response set consisting of a plurality of pilot subcarrier channel frequency responses corresponding to respective transmit antennas; and
  the channel estimation unit is configured to perform channel estimation based on correlation between the plurality of pilot subcarrier channel frequency responses corresponding to respective transmit antennas.

15. The apparatus according to claim 14, wherein the channel estimation unit is configured to, when the preamble elements of the pilot preamble symbol are mapped to subcarriers equally spaced or consecutively, perform a Fourier transform based channel estimation on the channel frequency response set to obtain an estimated channel frequency response set.

* * * * *